United States Patent

Deason

[11] Patent Number: 5,910,280
[45] Date of Patent: Jun. 8, 1999

[54] RELEASABLE PUSH-IN TUBE COUPLINGS

[75] Inventor: William S. Deason, Wheaton Aston, United Kingdom

[73] Assignee: IMI Norgren Limited, Staffordshire, United Kingdom

[21] Appl. No.: 08/729,411

[22] Filed: Oct. 11, 1996

[30] Foreign Application Priority Data

Oct. 11, 1995 [GB] United Kingdom .................... 9520748

[51] Int. Cl.⁶ ........................... B29C 33/44; B29C 43/42
[52] U.S. Cl. ....................... 264/296; 264/318; 264/322; 264/336
[58] Field of Search ..................... 264/318, 296, 264/322, 336, DIG. 66

[56] References Cited

U.S. PATENT DOCUMENTS

| | | | |
|---|---|---|---|
| 3,987,144 | 10/1976 | Nickold | 264/336 |
| 4,383,966 | 5/1983 | Svetlik | 264/296 |
| 4,394,343 | 7/1983 | Acda et al. | 264/296 |
| 4,428,899 | 1/1984 | van Manen | 264/249 |
| 4,457,886 | 7/1984 | Acda et al. | 264/249 |
| 4,709,757 | 12/1987 | Bly | 264/336 |
| 4,873,043 | 10/1989 | Meyers | 264/336 |
| 5,038,455 | 8/1991 | Guest | 29/453 |

FOREIGN PATENT DOCUMENTS

| | | |
|---|---|---|
| 0 518 679 A2 | 12/1992 | European Pat. Off. . |
| 1 520 742 | 8/1978 | United Kingdom . |
| 2 272 663 | 5/1994 | United Kingdom . |

*Primary Examiner*—Jan H. Silbaugh
*Assistant Examiner*—Mark Eashoo
*Attorney, Agent, or Firm*—Pillsbury Madison & Sutro LLP

[57] ABSTRACT

A method of making a one-piece, rigid thermoplastics body for a discrete, releasable push-in tube coupling device of the collet type comprises initially injection moulding the body about one or more rigid cores. Each rigid core is then withdrawn axially while the moulding is still in a plastic state whereby the outer, narrower bore portions of the body expand radially. The expanded portions are then radially contracted back to their as-moulded configuration using a jaw-like tool and finally the body is allowed to cool.

4 Claims, 2 Drawing Sheets

RELEASABLE PUSH-IN TUBE COUPLINGS

FIELD OF THE INVENTION

This invention relates to releasable push-in tube couplings and ore particularly to such a coupling of the type having a collet that, in he absence of a tube, may be readily assembled with the coupling body simply by inserting it thereinto from outside. Preferably, but not necessarily, the collet is readily removable from the body, again in the absence of a tube, simply by pulling it out whereby, for example, a damaged collet or seal, such as an O-ring, that also forms part of such a coupling may easily be replaced. Hereinafter, such a coupling is referred to as a "coupling of the type described".

DESCRIPTION OF THE PRIOR ART

Tube couplings of the type described are well-known and were first described in UK patent specification No 1520742. An essential feature of the body of such a coupling is a tube-receiving bore including a tapering portion that reduces in diameter towards the tube-receiving end of the body and that coacts with the collet arms thereby causing the collet to grip the tube more firmly in the event that the tube is accidentally pulled or the fluid pressure in it increases. Accordingly, accidental withdrawal or blow-out of the tube from the coupling is prevented. However, the tube can, if desired, be released from the coupling simply by pushing the collet inwardly whilst pulling the tube outwardly.

Originally, the bodies of couplings of the type described were made, conveniently in one piece, from metal, for example in the form of a machined brass stamping, machined brass rod or a die-casting. Over the years, however, a large demand has arisen for plastics-bodied tube couplings and the conventional wisdom, as evidenced by the practice of the various manufacturers, is that, whilst it would be highly desirable, it is not practicable to mould, in a thermoplastics material, the entire body of a coupling of the type described in one piece because of its internal configuration and hence the perceived need to use expensive, intricate tooling having collapsible cores which can, after the moulding step, be freely withdrawn through the relatively smaller diameter end portion of the bore. It would, in any case, be practically impossible to use such tooling to mould the bodies of small O.D. tube couplings of the type described.

Accordingly, it has been the practice, when making thermoplastics-bodied couplings of the type described, to provide the relatively smaller diameter end portion of the bore, including the tapering portion, on a separately formed component that is then assembled with a main body moulding that is internally cylindrical and can therefore be readily moulded in one piece. In other words, the body is of multi-part construction. UK Patent No 2120339, for example, describes one such construction wherein the separately formed component can be moulded in a plastics material using simple tooling and is then ultrasonically welded to the main body moulding. Alternatively, for example, it is known to use a separately formed annular metal insert comprising the tapering portion that is assembled with the main body moulding. Needless to say, those proposals have the disadvantage that, relative to one-piece metal bodies, the number of body components involved, and therefore the assembly costs, are increased.

With the above disadvantage in mind, International patent publication No WO94/21953 proposes design modifications to the body of a coupling of the type described in which the tapering portion of the bore is eliminated, the collet arms instead co-operating with radial slots formed in an internally cylindrical thermoplastics body which, therefore, can be readily moulded in one piece. However, this requires the use of a modified collet and, more significantly, it would in practice be necessary, as is indeed foreshadowed, to cover the external extremities of the slots with, for example, a plastics sleeve in order to prevent the ingress of foreign matter through the slots. This again entails the production of additional body components and additional assembly operations.

A proposal put forward for moulding the entire body of a coupling of the type described in one piece is disclosed in European patent application No 0518679. Here it is proposed to mould the body in one piece from an elastomer or other rubber-like material using conventional tooling including, in particular, rigid core tools. Thus, upon withdrawal of the core tools after the elastomer has cured, the relatively smaller diameter portions of the body can radially expand and automatically return to their as-moulded form. Additional body components are not stated to be required but it would, because of their inherent dimensional instability, be inappropriate to use elastomeric bodies in high pressure applications, eg pneumatic control applications in which couplings of the type described are widely used, without an additional, reinforcing, body component.

Finally, recently published UK patent application No 2292780 proposes a moulded thermoplastics body for a tube coupling that, generally, is similar to couplings of the type described. This application specifically acknowledges the hitherto perceived need to use collapsible core tools in order to mould in one piece rigid plastics bodies for couplings of the type described and proposes the moulding of a body pre-form that is internally cylindrical and can therefore be moulded in one piece using a simple rigid core tool. The socket ends of the preform are formed with a number of longitudinal slots so that they can subsequently be deformed radially inwards to provide the desired, final internally tapering configuration and they are retained in that configuration by an external metal cap. Again, therefore, additional body components are required and the moulding tooling required will necessarily be more complex because of the need to form the slots.

Despite being a long-standing problem that has continually been addressed by those skilled in the art, as is evidenced by the above, there have hitherto to our knowledge been no proposals whereby there may be produced, as a rigid, one-piece, integral moulding in a thermoplastics material, the entire body for a coupling of the type described (ie. a body that is like the original, but still widely available and used, one-piece metal bodies) without using intricate and expensive collapsible core tools.

The present invention proposes an elegant solution to that problem which combines a conventional moulding process utilising one or more (as appropriate) rigid core tools with a simple post-moulding deformation step.

SUMMARY OF THE INVENTION

According to one aspect of the present invention, therefore, there is provided a method of moulding, in one piece, a rigid thermoplastics body for a tube coupling of the type described by using tooling including at least one rigid core for defining the internal bore surfaces thereof which method comprises, subsequent to the moulding step, withdrawing the said core in an axial direction through that portion of the body defining the relatively smaller diameter outer end portion of the bore, including the tapering portion thereof, whilst the body or at least said portion thereof is still in a plastic state whereby said portion radially expands, subsequently radially thermoforming the expanded portion, whilst in a plastic state, substantially back to its as-moulded condition, and causing or allowing the moulding to cool.

The present invention also provides a body, made by the aforesaid method, for a coupling of the type described and such a coupling including such a body provided with one or more elastomeric seals and one or more tube-gripping collets.

Further, the present invention provides injection moulding tooling adapted for use in the method of the invention.

The expanded portion of the coupling body may, whilst in a plastic state, be thermoformed back (ie. contracted) to its desired, as-moulded, condition by, for example, using a cylindrical die or a jaw-like device. The contraction step is preferably carried out immediately pursuant to the core extraction step whilst the body (or at least said expanded portion thereof) is still in a plastic state as a result of the moulding operation. However, it may be effected later after a reheating operation.

Needless to say, the core withdrawal and the contraction steps will be carried out when the plastics material used is at such an elevated temperature, and so sufficiently plastic, that the requisite expansion/contraction can be effected without at the same time otherwise unduly deforming (for example significantly axially deforming) the moulding. Naturally, the optimum temperature or temperature ranges at or within which the withdrawal and contraction steps respectively are carried out will depend on the particular plastics material used and may readily be determined by simple trial and experiment. Where, as is preferred, the contraction step is carried out immediately pursuant to the core extraction step, the former will take place at a slightly lower temperature than the latter because, of course, the moulding will have had slightly more time to cool.

In principle, any thermoplastic moulding material may be used but it is preferably a crystalline one. We mention, by way of example only, acetals, polyamides, polypropylenes, polyethylenes and polybutyleneterephthalates.

BRIEF DESCRIPTION OF THE DRAWINGS

The invention will now be described in more detail, by way of example only, with reference to the accompanying drawings, in which.

DESCRIPTION OF THE PREFERRED EMBODIMENTS

Figure 1:
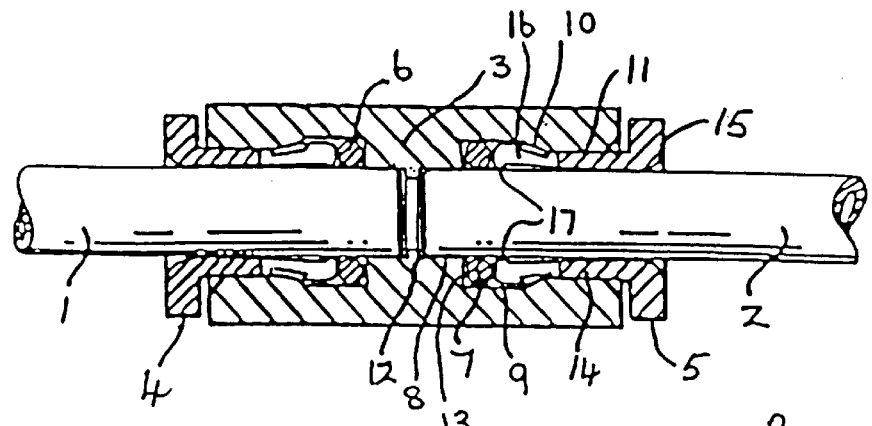
FIG. 1 is a sectional side elevation of a typical straight tube coupling of the type described having a one-piece body.

Referring to FIG. 1 of the drawings, there is shown a typical "straight" tube coupling of the type described joining together two tubes 1 and 2. The tubes 1 and 2 may be rigid or semi-rigid but couplings of the type described are used primarily for joining together flexible tubing, for example plastics tubing, especially in compressed air installations.

The coupling comprises a one-piece cylindrical body 3 having two opposed tube-receiving bores that retain respective collets 4, 5 and O-ring seals 6, 7. More particularly (and referring just to the right-hand portion that receives the tube 2, the left-hand portion being identical) the bore comprises an innermost cylindrical portion 8 that snugly receives the inner end of the tube 2, a larger diameter, cylindrical portion 9, a frusto-conical portion 10 that tapers, in an axial direction, to a smaller diameter and an outermost cylindrical portion 11. The innermost cylindrical portion 8 terminates, at its inner end, at an annular shoulder 12 which defines a tube-end stop for limiting insertion of the end of the tube 2 whilst the cylindrical portion 9 terminates at its inner end at an annular shoulder 13 where the O-ring seal 7 is seated. The O-ring seal 7 forms a fluid-tight joint with the tube 2.

The bore retains the collet 5 which comprises a cylindrical portion 14 slidably supported by the cylindrical portion 11 of the bore of the body 3 and having, at its outer end, an integral radially extending flange 15 and, extending axially from its inner end, a plurality of (eg from four to eight) integral, mutually spaced arms 16 etc. Each arm 16 etc, which can flex radially, has an enlarged inner end that carries a sharp tube gripping projection or "tooth" 17. The collet 5 is assembled into the body 3 simply by inserting it thereinto through the outermost portion 11 (in, of course, the absence of a tube) during which the arms 16 etc flex radially inwards by virtue of the spacing between them and return to their normal position once the collet 5 has been inserted. Typically, the collets 4 and 5 are made in one-piece from brass, but they may alternatively each comprise a plastics moulding.

The tube 2 is coupled to the coupling simply by pushing it thereinto through the collet 5 and the O-ring 7 until it abuts the shoulder 12. The teeth 17 lightly grip the tube 2 under normal circumstances. However, when the tube 2 is accidentally pulled, or the fluid pressure within it increases, the collet 5 moves slightly axially outwards whereupon the frusto-conical portion 10 of the bore, in co-acting with the enlarged ends of the collet arms 16 etc, forces the arms 16 etc radially inwards; thus, they increase their grip on the tube 2 and prevent accidental withdrawal or blow-out of the tube 2 from the coupling. However, the tube 2 may be withdrawn from the coupling by depressing the collet 5 inwardly and simultaneously pulling the tube 2. The tube 2 may be re-coupled to the coupling in the manner referred to above.

In the absence of a tube, the collet 5 may be withdrawn simply by pulling it out, whereupon the spaced arms 16 etc collapse radially enough for them to pass through the narrower diameter portion 11 of the bore. Accordingly, it is easy to replace a damaged collet 5 or, once the collet has been removed, a damaged O-ring seal 7.

The flange 15 on the collet 5 is optional but it facilitates assembly of the collet 5 with, or disassembly of it from, the body 3 as well as manual depression of the collet 5 when it is desired to decouple a tube from the coupling.

Tube couplings of the type described, as exemplified by the above, are very well-known in the art and whilst, for example, the cylindrical bore portion 11 could be omitted, there is an essential requirement for the frusto-conical portion 10. Hitherto, those with a body fabricated wholly in one piece have always been made of a metal whereas, as already noted, those having rigid thermoplastics bodies have always had multi-part body constructions.

Figure 2A:
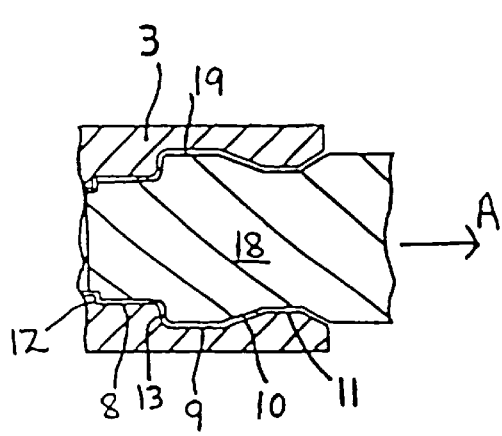
FIGS. 2*a*, 2*b* and 2*c* illustrate, purely schematically, the steps involved in a preferred method of the invention.
Figure 2B:
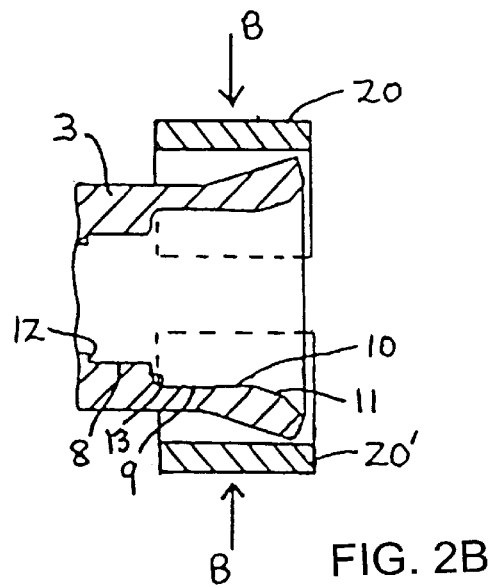
Figure 2C:
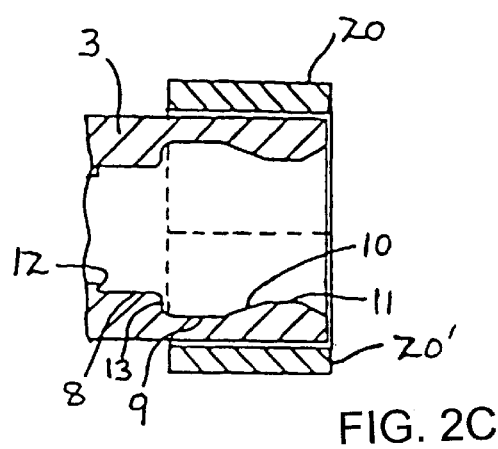

FIGS. 2*a* to 2*c* illustrate schematically a method of the present invention whereby the entire body 3 may be made in one piece as a 10 rigid, thermoplastics moulding.

Referring firstly to FIG. 2*a*, this shows part of a body of a coupling of the type described after it has been moulded by a conventional injection moulding technique but before withdrawal of a rigid cylindrical core tool 18 required to mould the internal surfaces of the part of the body 3 shown. More particularly, it will be seen that the part shown is more or less identical in form to the right-hand portion of the one-piece body 3 shown in FIG. 1 and indeed FIGS. 2a to 2c bear the same respective reference numerals.

Whilst the body moulding 3 (or at least the portions 10 and 11 thereof) is still plastic following the moulding operation, the core tool 18 is, after separation of the tools (not shown) used to shape the exterior of the body moulding 3, fully withdrawn axially in the direction of arrow A during which the cylindrical land 19 of the core tool 18 (ie. the maximum diameter portion of it) radially expands the portion 10 (the 25 frusto-conical portion) and the portion 11 (the outermost cylindrical portion). During that process, the moulding is restrained against axial movement by means that forms part of the tooling. The resulting moulding is shown in FIG. 2b, although in certain cases, depending on the properties of the plastics material used, the radially expanded portions may relax slightly towards their original as-moulded form. The moulding shown in FIG. 2b may be thermoformed, after being cooled and re-heated, at a different workstation to give the final moulding shown in FIG. 2c. Ideally, however, the thermoforming step will be carried out immediately after the core tool 18 has been fully withdrawn and whilst the moulding is still in a sufficiently plastic state consequent on the moulding process.

In any event, the thermoforming step involves radially contracting the expanded portions substantially back to their as-moulded form as shown in FIGS. 2a and 2c. This may be effected using, for example, a pair of semi-cylindrical jaws shown diagramatically at 20, 20' in FIGS. 2b and 2c, the jaws being closed radially in the direction of the arrows B (see FIG. 2b). The jaws 20, 20' may be incorporated in a separate cavity within the main body moulding block. Other methods, however, such as for example the use of a cylindrical female die, may be used as is schematically illustrated in FIG. 3.

Figure 3:
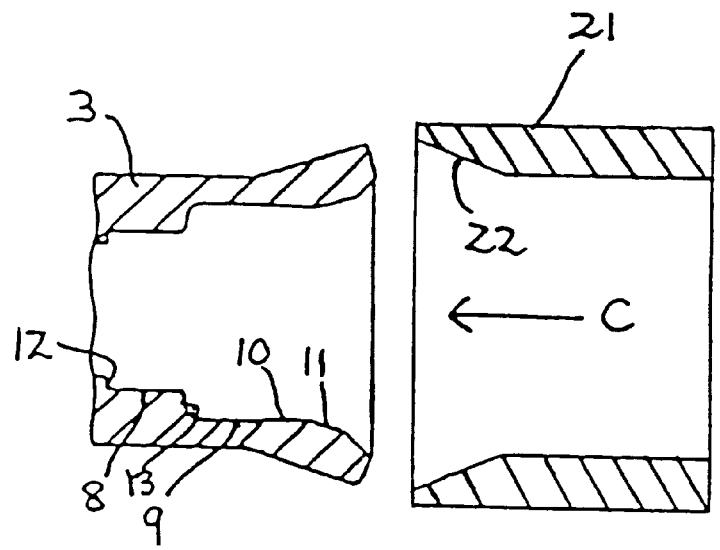
FIG. 3 illustrates, purely schematically, an alternative method of carrying out the contraction step.

FIG. 3 shows, as in FIG. 2b, the moulding after withdrawal of the tool core 18. Radial contraction of the expanded portion is effected by axially advancing, in the direction of arrow C, a female die 21 over it whilst it is in a plastic state. As can be seen, the mouth of the die is tapered at 22 in order to facilitate reception of the expanded portion in the die 21.

After the contraction step, the moulding is allowed to cool to give the finished body.

As noted above, any thermoplastic moulding material may be used in principle, although we prefer to use a crystalline "engineering" plastics material such as an acetal (for example HOSTAFORM—trade mark) or a polyamide (for example Nylon 6). For these particular materials, the contraction step is typically carried out at about 150° C. whereas the core withdrawal step, where it immediately precedes the contraction step, will be carried out at a slightly higher temperature, say around 155–165° C.

Reverting to FIG. 2a, it will be appreciated that the internal surfaces of a body having two or more tube-receiving ends will be formed by respective cores 18. Thus, for example, a straight coupling of the type shown in FIG. 1 would require the use of two cores and they would usually be withdrawn simultaneously in opposite axial directions whilst the moulding is still sufficiently plastic.

Figure 4:
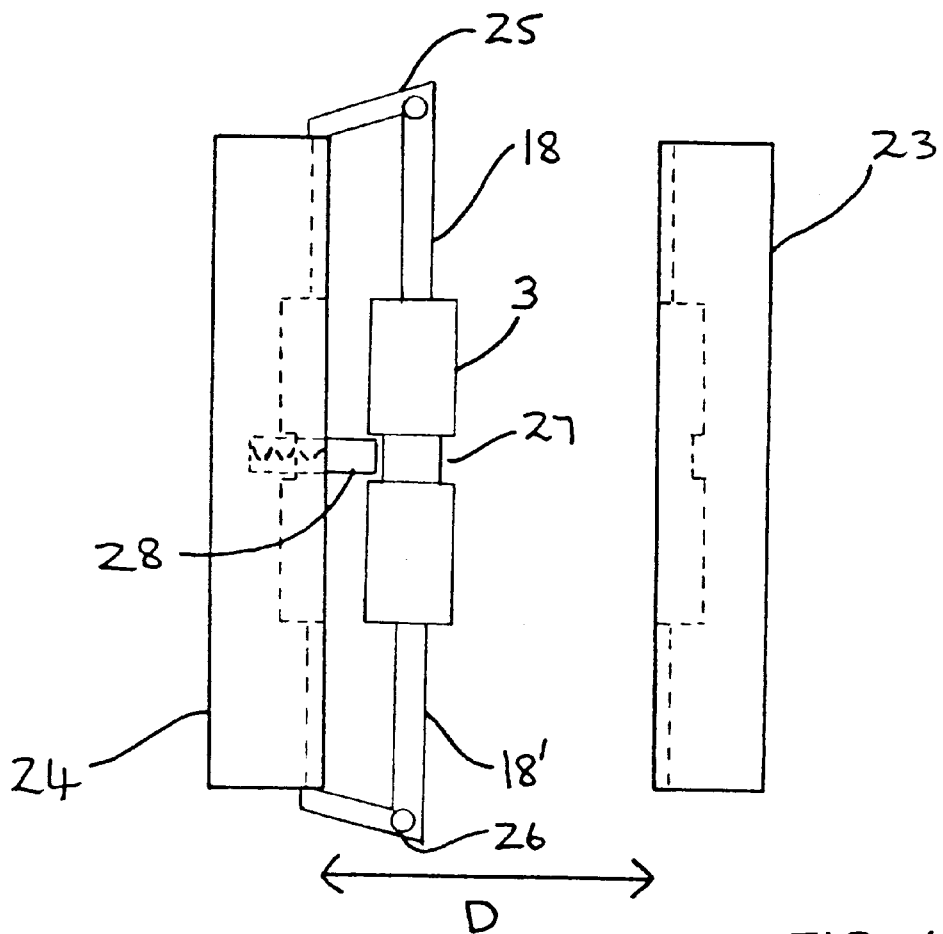
FIG. 4 is a schematic plan view of tooling used to mould the body of a straight coupling in accordance with the method of the invention.

FIG. 4 illustrates, purely schematically, an example of tooling that may be used to mould a straight coupling body in accordance with the method of the invention. The tooling comprises two halves 23 and 24, one of which (23) is fixed and the other of which (24) is laterally moveable as indicated by the double arrow D and carries the two core tools 18 and 18'. FIG. 4 shows the tooling after the body 3 has been moulded and the two halves 23 and 24 have been separated, by lateral movement of the half 24, but before withdrawal of the core tools 18 and 18'. As the tool half 24 is moved laterally following the main moulding process, the moulded body 3 is moved laterally out of the cavity in the tool half 24 by lever systems 25 and 26 which support and actuate the core tools 18 and 18'.

As can be seen, the body 3 is formed with a central, external annular recess 27 and, as the moulded body is moved out of the cavity in tool half 24 as aforesaid, a small, spring-loaded detent 28 mounted in the tool half 24 is urged into the recess 29. The detent 28 serves to restrain the body 3 against axial movement when the core tools 18 and 18' are subsequently withdrawn in an axial direction by the lever systems 25 and 26 whilst the body 3 is still at an elevated temperature, and therefore still in a plastic state, consequent on the main moulding operation.

Immediately after withdrawal of the core tools 18 and 18', the body 3 with its expanded end portions is transferred to a further station (not shown) where the expanded portions are, whilst still in a plastic state, contracted back to their as-moulded configuration. As noted earlier, the tooling used to effect the contraction may be incorporated in the tooling halves 23 and 24 and, as such, the contraction step may take place as the tool halves 23 and 24 are subsequently re-closed in readiness for moulding a further body 3, and so on.

Of course, the method could be used to mould a one-piece body of any configuration or size of coupling of the type described including but not limited to straight, T- and elbow couplings and cartridge type couplings for incorporation into, for example, pneumatic valve or cylinder bodies. Also, as will be apparent, the method is well-suited to being fully automated.

What I claim is:

1. A method of moulding, in one piece, a rigid thermoplastics body for a discrete, releasable push-in tube coupling device, said body having at least one terminal portion for receiving a tube to be coupled to the coupling device, said terminal portion comprising a wall having an externally cylindrical surface and defining an axial bore having an open end for receiving said tube, said bore having a cylindrical portion for seating an annular seal and, intermediate said cylindrical portion and said open end of said bore, a tapering portion that progressively reduces in internal diameter towards said open end of said bore, whereby said wall progressively increases in thickness from said cylindrical portion of said bore towards said open end thereof; said bore being adapted to receive a hollow tube-gripping collet that co-acts with said tapering portion of said bore thereby to retain said tube in the coupling device if said tube is accidentally pulled, the method comprising, in the following order, the steps of:

(a) injection moulding a thermoplastic material to form said body using tooling comprising separable tool portions for externally defining said body including said externally cylindrical surface of said wall, and a rigid core tool for defining said axial bore, said separable tool portions and said rigid core tool being configured relative to each other such that said wall formed therebetween progressively increases in thickness from said cylindrical portion of said bore towards said open end thereof, (b) separating said separable tool portions whilst said body moulded in step (a) is still in a plastic state pursuant to step (a), (c) withdrawing said rigid core tool in an axial direction through said open end whilst the said body moulded in step (a) is still in a plastic state pursuant to step (a), whereby the said wall, where said wall surrounds said tapering portion of said bore, radially expands to provide a radially expanded portion, (d) subsequently radially thermoforming said radially expanded portion substantially back to said wall's externally cylindrical surface configuration as moulded in step (a); and (e) causing or allowing said body to cool.

2. A method according to claim 1 wherein step (d) is carried out by closing jaws about said radially expanded portion.

3. A method according to claim 1 wherein step (d) is carried out by means of a cylindrical femal die.

4. A method according to claim 1 wherein step (d) is carried out immediately pursuant to step (c) whilst the body is still in a plastic state pursuant to step (a).

\* \* \* \* \*